(12) United States Patent
Tremblay

(10) Patent No.: US 10,625,745 B1
(45) Date of Patent: Apr. 21, 2020

(54) AUTOMATED DRIVER'S EXAM SYSTEM

(71) Applicant: Sean Tremblay, Austin, TX (US)

(72) Inventor: Sean Tremblay, Austin, TX (US)

( * ) Notice: Subject to any disclaimer, the term of this patent is extended or adjusted under 35 U.S.C. 154(b) by 0 days.

(21) Appl. No.: 16/241,690

(22) Filed: Jan. 7, 2019

(51) Int. Cl.
| G06Q 30/00 | (2012.01) |
| B60W 40/09 | (2012.01) |
| G06F 3/01  | (2006.01) |
| G06K 9/00  | (2006.01) |
| B60W 50/14 | (2020.01) |

(52) U.S. Cl.
CPC ............ *B60W 40/09* (2013.01); *B60W 50/14* (2013.01); *G06F 3/012* (2013.01); *G06F 3/013* (2013.01); *G06K 9/00805* (2013.01); *G06K 9/00818* (2013.01); *G06K 9/00825* (2013.01); *G06K 9/00845* (2013.01); *B60W 2050/143* (2013.01); *B60W 2050/146* (2013.01); *B60W 2420/42* (2013.01); *B60W 2520/105* (2013.01); *B60W 2540/12* (2013.01); *B60W 2540/18* (2013.01); *B60W 2540/20* (2013.01); *B60W 2550/14* (2013.01)

(58) Field of Classification Search
USPC .............................................. 340/576; 434/62
See application file for complete search history.

(56) References Cited

U.S. PATENT DOCUMENTS

| 3,334,484 A | 8/1967 | Turgeon |
| 3,991,485 A | 11/1976 | Golenski |
| 4,358,272 A | 11/1982 | Gurtner |
| 4,385,518 A | 5/1983 | Rickett |
| 4,970,655 A | 11/1990 | Winn et al. |
| 5,193,062 A | 3/1993 | Murase et al. |
| 5,363,027 A | 11/1994 | Noguchi |
| 5,430,645 A | 7/1995 | Keller |
| 5,821,718 A | 10/1998 | Shaffer et al. |
| 6,200,139 B1 * | 3/2001 | Clapper ................. G09B 9/042 434/62 |
| 6,222,463 B1 | 4/2001 | Rai |
| 6,315,292 B1 | 11/2001 | Howlett et al. |
| 6,546,119 B2 | 4/2003 | Ciolli et al. |
| 7,812,712 B2 | 10/2010 | White et al. |
| 7,986,339 B2 | 7/2011 | Higgins |
| 8,521,338 B2 | 8/2013 | Takeuchi et al. |
| 8,598,977 B2 | 12/2013 | Maalouf et al. |
| 8,738,523 B1 | 5/2014 | Sanchez et al. |

(Continued)

*Primary Examiner* — Brent Swarthout
(74) *Attorney, Agent, or Firm* — Sean Christian Connolly

(57) ABSTRACT

Disclosed herein are systems for modifying a standard automobile in order to perform an automated driver's exam on a driver of the modified automobile, which monitor the driver, the automobile, and the surroundings of the automobile during the driver's exam, and compare the monitored data to benchmark data in order to determine whether the driver's exam is passed. The systems may monitor the behavior of the driver, such as eye movement, head position, posture, or the like; the motion of the automobile, such as speed, acceleration, braking, or the like; the configuration of the automobile, such as the wheel position, turn signal switch position, or the like; the surrounding of the automobile, such as road conditions, positions of other vehicles, obstacles, signs, signals, or the like. The systems may also provide feedback during automated driving exams or practice exams by proving a display and speaker.

1 Claim, 16 Drawing Sheets

(56) References Cited

U.S. PATENT DOCUMENTS

| | | | |
|---|---|---|---|
| 9,494,091 B2 | 11/2016 | Takeuchi et al. | |
| 9,740,206 B2 | 8/2017 | Park | |
| 10,241,509 B1* | 3/2019 | Fields | G07C 5/0808 |
| 2008/0254417 A1 | 10/2008 | Mohamed | |
| 2011/0224868 A1 | 9/2011 | Collings et al. | |
| 2013/0145482 A1 | 6/2013 | Ricci et al. | |
| 2013/0204466 A1 | 8/2013 | Ricci | |
| 2015/0104757 A1 | 4/2015 | Moncrief et al. | |
| 2015/0187224 A1 | 7/2015 | Moncrief et al. | |
| 2016/0005332 A1 | 1/2016 | Cale | |
| 2017/0193523 A1 | 7/2017 | Goldin et al. | |
| 2017/0305434 A1 | 10/2017 | Ratnasingam | |
| 2018/0197440 A1* | 7/2018 | Ramachandra | G09B 19/167 |
| 2018/0237027 A1* | 8/2018 | Lundsgaard | B60W 50/0098 |

* cited by examiner

AUTOMATED DRIVER'S EXAM SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of driving exams. More particularly, the preferred embodiments of the present invention relate generally to automated driving exams. More particularly, the preferred embodiments of the present invention relate generally to automated driving exam systems. More particularly, the preferred embodiments of the present invention relate generally to automated driving exam systems, which monitor the driver and the automobile. More particularly, the preferred embodiments of the present invention relate generally to automated driving exam systems, which modify standard automobiles in order to monitor the driver and the automobile during an automated driving exam.

2. Description of the Related Art

State organizations that issue driver's licenses, such as Departments of Motor Vehicles, often use specialized and expensive vehicles during driver's license exams for prospective licensed drivers. These organizations usually require employees or personnel to accompany the prospective licensed driver and perform the examination, who may have bias against the prospective licensed driver or lack consistency in rendering driver's exams. Often, problems arise because these specialized vehicle and personnel are not available when a prospective licensed driver trains and practices for the exam, thereby limiting a real-time examination experience and stifling useful feedback for the prospective driver to improve their skills.

The broad concept of systems that monitor vehicles is known. However, these systems are not generally used to perform automated driver's exams.

Systems that use cameras to monitor vehicles or drivers are also known. However, these systems usually passively monitor the vehicles or drivers for later reference and do not provide real-time feedback for an automated driver's exam.

Systems that use accelerometers or magnetometers to monitor vehicles or drivers are known as well. However, these systems are often used for measuring the motion of the vehicle only and not different parts of the vehicle, such as the steering wheel or turn signal switch.

Additionally, systems that use GPS to monitor vehicles or drivers are known. However, these systems are used for navigation of the vehicle or the whereabouts of the driver and not for rendering an automated driver's exam.

It is also known to use automated vehicle registration. However, this automated vehicle registration does not usually include the performance of an automated driver's exam on an ordinary road.

It is also known to use automated vehicle ticketing. However, this automated vehicle ticketing does not usually include the performance of an automated driver's exam on an ordinary road.

Additionally, systems that train automobile drivers are known. However, these systems usually rely on a virtual environment or a controlled course, and do not allow for the modification of the driver's own automobile or the use on ordinary roads.

Driver's exams are also known. However, these exams are not dynamic and do not modify a standard automobile to automatically gather performance data during an automated driver's exam on ordinary roads.

Driver's exams, which use predetermined routes, are known as well. However, these predetermined routes are not usually created dynamically by measuring driver's exam data on ordinary roads.

SUMMARY OF THE INVENTION

The broad embodiments of the present invention relate generally to systems for performing an automated driver's exam using a standard automobile. The present invention provides a system, which may modify a standard automobile in order to allow it to be used to perform driver's exams, or practice driver's exams, without the reliance of specialized personnel, and which may consistently monitor's multiple aspects of a driver's behavior during driving or during a driving exam. Such a system could also be provided to the State organizations to control the expense and improve the consistency of driver's exams. In broad embodiment, the Automated Driver's Exam System invention relates to a system for modifying a standard automobile in order to perform an automated driver's exam on a driver of the modified automobile.

In the more preferred embodiments, the present invention relates to systems for modifying a standard automobile in order to perform an automated driver's exam on a driver of the modified automobile, which monitor the driver, the automobile, and the surroundings of the automobile during the driver's exam, and compare the monitored data to benchmark data in order to determine whether the driver's exam is passed. The systems may monitor the behavior of the driver, such as eye movement, head position, posture, or the like; the motion of the automobile, such as speed, acceleration, braking, or the like; the configuration of the automobile, such as the wheel position, turn signal switch position, or the like; the surrounding of the automobile, such as road conditions, positions of other vehicles, obstacles, signs, signals, or the like. The systems may also provide feedback during automated driving exams or practice exams by proving a display and speaker.

In the most preferred embodiments, the present invention relates to automated driver's exam systems, which comprise a main module comprising: a central hub; a display screen; an audio speaker; a dash camera, which comprises a video camera that is mounted at midpoint of the front window of the automobile and which gathers live video that is processed using deep learning techniques so that traffic data, signage, other vehicles, pedestrians, or the like, can be detected, identified, and classified, in conjunction with available state information regarding road features or traffic conditions; a face camera, which comprises a video camera attached to the central hub, which gathers live video that is processed using deep learning techniques in order to detect and identify the driver's facial position and to determine whether the driver is using the proper eye and head movement while maneuvering the vehicle; a first processor, which comprises a Raspberry Pi, or the like, and handles communications with sub-controllers to convey data to users on the display screen and to signal audio cues at significant events using the audio speaker; and a second processor, which comprises a Raspberry Pi, or the like, and handles video processing for the dash camera and face camera, that are connected to each other via TCP communication; a merge detector, which detects and reports distances of objects that are close to the side of the automobile in order determine whether or not it is safe to merge or if there is an object that will or should prevent a merge, comprising: a body housing; a microcontroller; an ultrasonic rangefinder, which identifies objects that are within a wide cone of the merge detector's position under the side-view mirrors; a BLE communication device; magnetic connectors; Velcro straps; a battery; and a body housing, which contains the microcontroller, ultrasonic rangefinder, BLE communication device, and battery, and which connects to the driver's side door of the automobile using the magnetic connectors and the Velcro straps, which may be secured to the side-view mirrors of the automobile; a wheel detector, which determines the handling of the automobile during an automated driver's exam, comprising: a microcontroller system; a BLE communication device; Velcro straps; a battery; an IMU sensor, which comprises a fusion between a magnetometer and an accelerometer and which is used to report positions to the microcontroller system and which reports the changes in position to the main module using the BLE communication device when small changes in position are made on one axis; and a small housing, which contains the microcontroller system, BLE communication device, battery, and IMU sensor, and which fastens to the steering wheel of the automobile using the Velcro straps; a blink detector, which determines whether proper turn signals are used during an automated driver's exam, comprising: a small housing; a microcontroller system; a serial USB communication device; a GPS module, which tracks position and speed relative to previous positions and reports this data to the main module using the serial USB communication device; Velcro straps; a battery; an IMU sensor, which comprises a fusion between a magnetometer and an accelerometer and which is used to report positions to the microcontroller system and which reports the changes in position to the main module using the serial USB communication device when small changes in position are made on one axis; and a small housing, which contains the microcontroller system, GPS module, battery, and IMU sensor, and which fastens to the turn signal of the steering wheel of the automobile using the Velcro straps; wherein data gathered from the main module, the merge detector, the wheel detector, and the blink detector, during a set driving course is compared to benchmark data in order to determine whether the driver's exam is passed.

BRIEF DESCRIPTION OF THE DRAWING

Illustrative and preferred embodiments of the present invention are shown in the accompanying drawings in which.

DETAILED DESCRIPTION OF THE PREFERRED EMBODIMENTS

Figure 1:
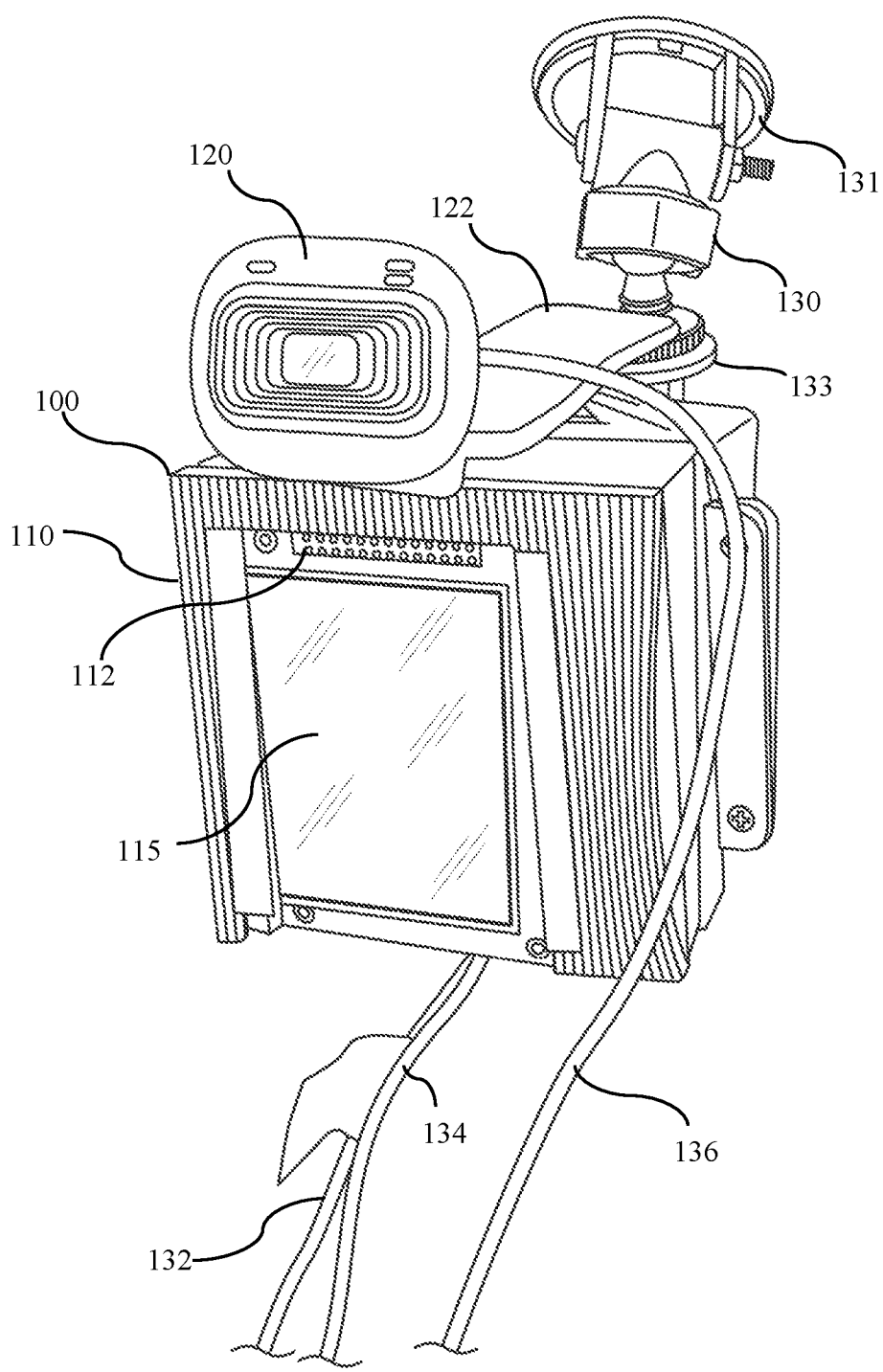
FIG. 1 is a front perspective view of a main module of the present invention.

For the purpose of illustration, the present invention is shown in the most preferred embodiment of a system for performing an automatic driver's exam on a driver using an automobile; said automobile comprising: a windshield, a driver's side door, a side-view mirror depending from said driver's side door, a steering wheel, and a turn signal switch depending from said steering wheel; said system comprising: a merge detector, said merge detector comprising: a body housing, a microcontroller, an ultrasonic rangefinder, a first BLE communication device, magnetic connectors, first Velcro straps, a first battery, and a body housing, which contains said microcontroller, said ultrasonic rangefinder, said first BLE communication device, and said first battery, and which connects to said driver's side door of said automobile using said magnetic connectors and said first Velcro straps, which may be secured to said side-view mirror of said automobile; a wheel detector, said wheel detector comprising: a first microcontroller system, a second BLE communication device, second Velcro straps, a second battery, a first IMU sensor, which comprises a magnetometer and an accelerometer and which is used to report changes in positions to said first microcontroller system, and a first small housing, which contains said first microcontroller system, said second BLE communication device, said second battery, and said IMU sensor, and which fastens to said steering wheel of said automobile using said second Velcro straps; a blink detector, said blink detector comprising: a second microcontroller system, a serial USB communication device, a GPS module, which reports position and speed to said second microcontroller system, third Velcro straps, a third battery, a second IMU sensor, which is used to report changes in positions to said second microcontroller system, and a second small housing, which contains said second microcontroller system, said GPS module, said third battery, and said second IMU sensor, and which fastens to the said turn signal switch of said steering wheel of said automobile using said third Velcro straps; and a main module, said main module comprising: a central hub, a display screen depending from said central hub, an audio speaker depending from said central hub, a dash camera, said dash camera comprising: a first video camera, which is mounted on said windshield of said automobile, a face camera, said face camera comprising: a second video camera attached to said central hub, a first processor, said first processor being capable of interacting with said dash camera and said face camera in order to process video signals from said dash camera and said face camera, and a second processor, said second processor comprising: a memory stored in non-transitory computer-readable medium, said second processor being capable of interacting with said first processor via TCP communication, with said microcontroller of said merge detector using said first BLE communication device, with said first microcontroller system of said wheel detector using said second BLE communication device, with said second microcontroller system of said blink detector using said serial USB communication device, with said display screen, and with said audio speaker, in order to gather data and store said data in said memory, convey said data on said display screen, and to signal audio cues using said audio speaker, said data comprising information generated by said main module, said merge detector, said wheel detector, and said blink detector; wherein said dash camera of said main module gathers live video of the surroundings of said automobile, which is processed by said first processor using deep learning techniques so that traffic data, signage, other vehicles, pedestrians, or obstacles may be detected, identified, and classified, in conjunction with available state information regarding road features and traffic conditions, wherein said face camera of said main module gathers live video of said driver, which is processed by said first processor using said deep learning techniques in order to detect and identify said driver's facial position and to determine whether said driver is using the proper eye and head movement while maneuvering said automobile; wherein said merge detector detects and reports distances of objects that are close to said driver's side door of said automobile using said ultrasonic rangefinder; wherein said wheel detector detects and reports the handling of said steering wheel of said automobile using said first IMU sensor; wherein said blink detector detects and reports position using said GPS module and the use of turn signals using said second IMU sensor; wherein a set driving course is properly driven while recording said data from said main module, said merge detector, said wheel detector, and said blink detector, to determine benchmark data, said benchmark data comprising said data recorded during properly driven said set driving course; wherein said set driving course is driven by said driver during said automatic driver's exam while recording said data from said main module, said merge detector, said wheel detector, and said blink detector, to determine exam data, said exam data comprising said data recorded during said set driving course driven by said driver; and wherein said exam data is compared to said benchmark data by said second processor in order to determine whether said driver passed said automatic driver's exam. This embodiment is not intended to limit the scope of the present invention.

Figure 2:
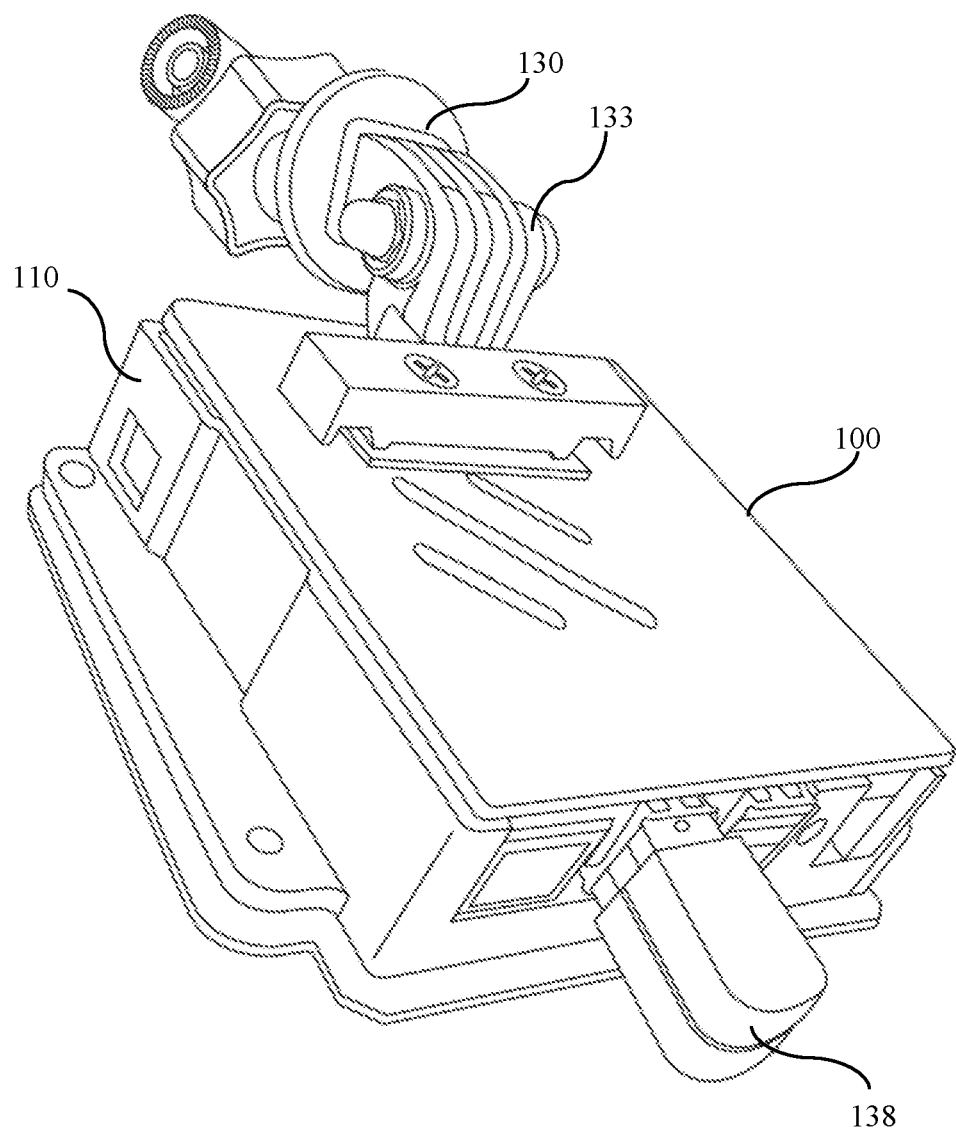
FIG. 2 is a rear perspective view of a main module of FIG. 1.
Figure 3:
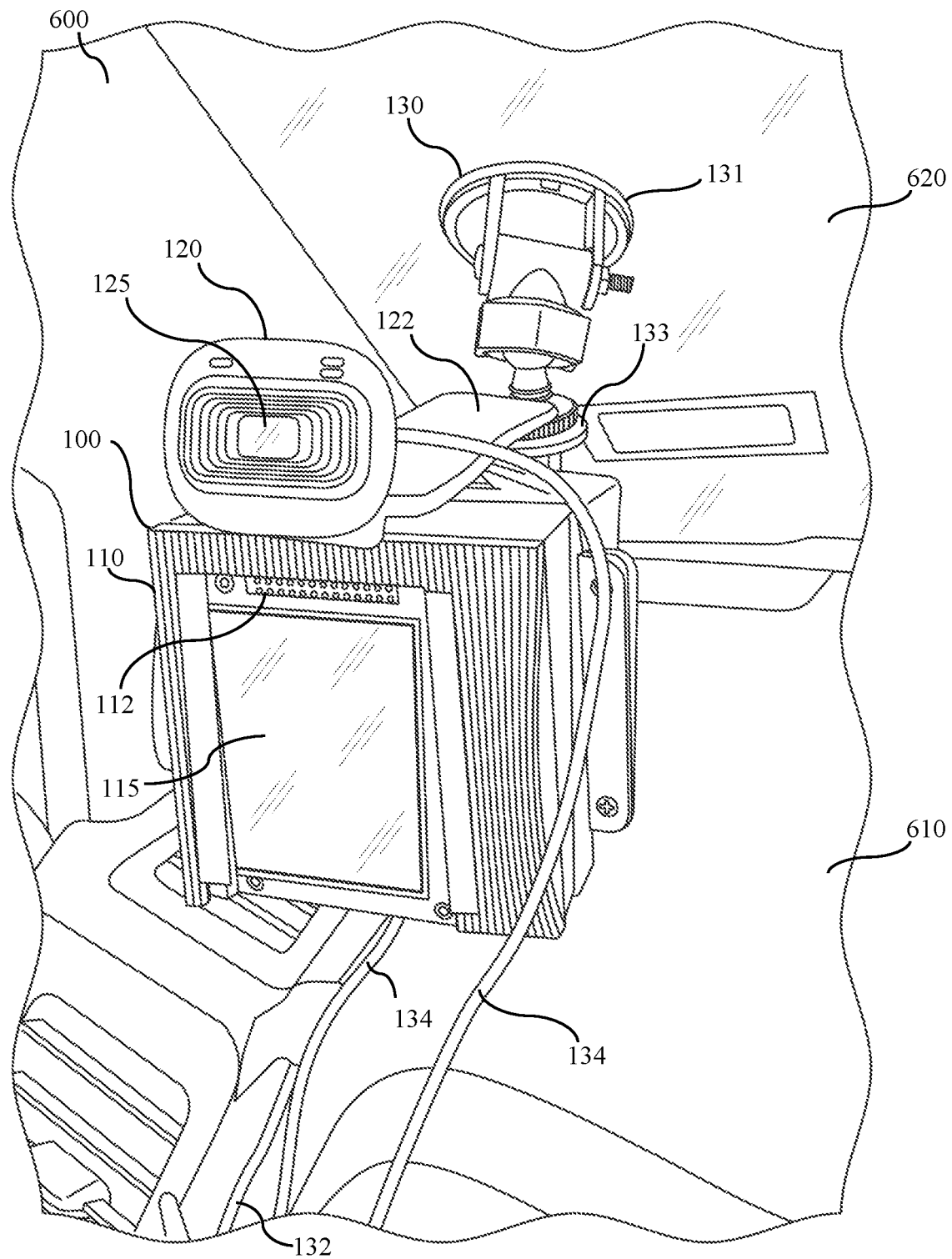
FIG. 3 is a front perspective view of a main module of FIG. 1 mounted on the inside of a windshield in the passenger compartment of an automobile.
Figure 4:
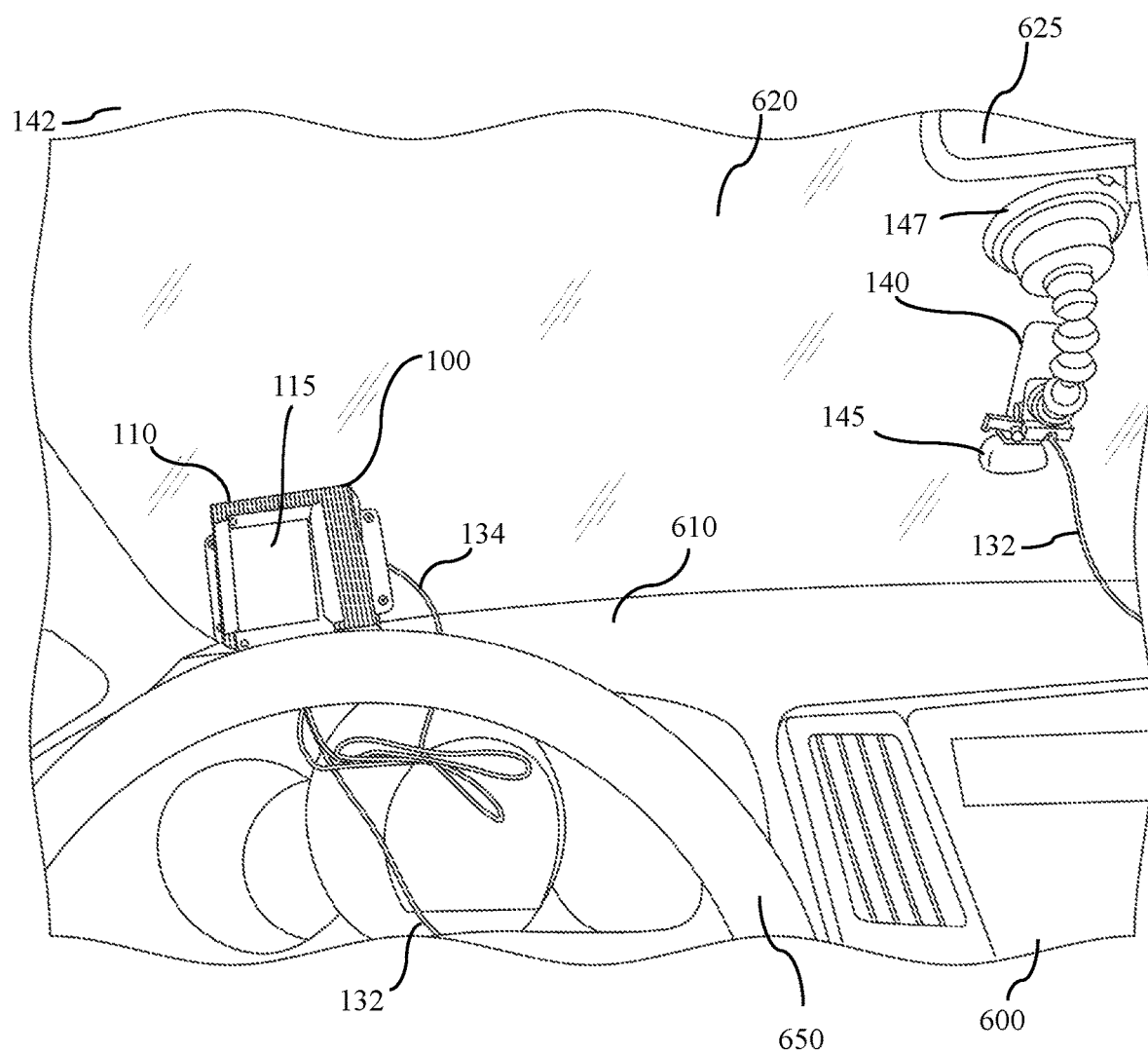
FIG. 4 is a front perspective view of a main module of FIG. 1 mounted on the inside of a windshield in the passenger compartment of an automobile, which shows a dash camera mounted on the inside of a windshield in the passenger compartment of an automobile under the rear view mirror of the automobile.
Figure 5:
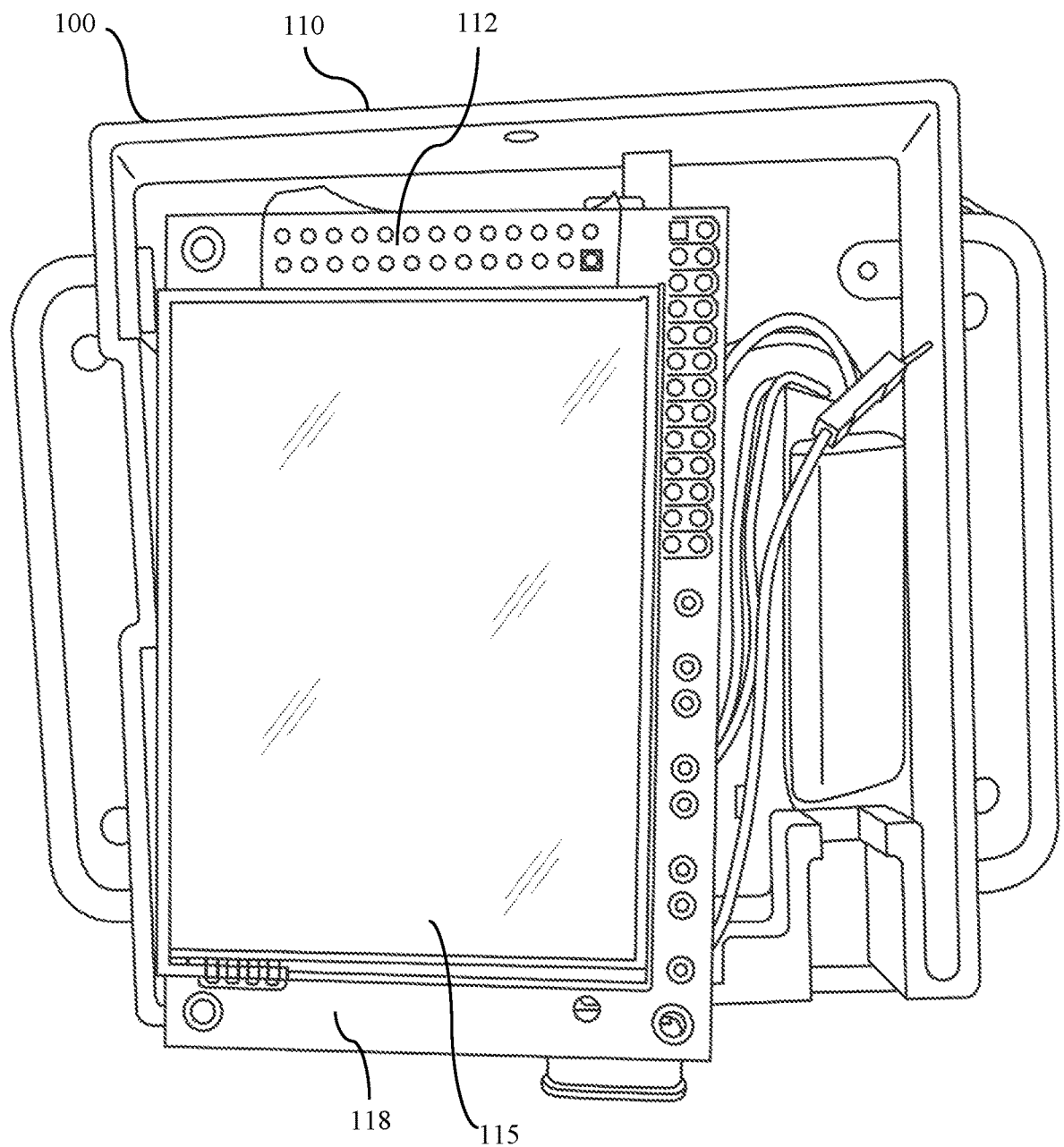
FIG. 5 is a front perspective view of the internal parts of a main module of FIG. 1.
Figure 6:
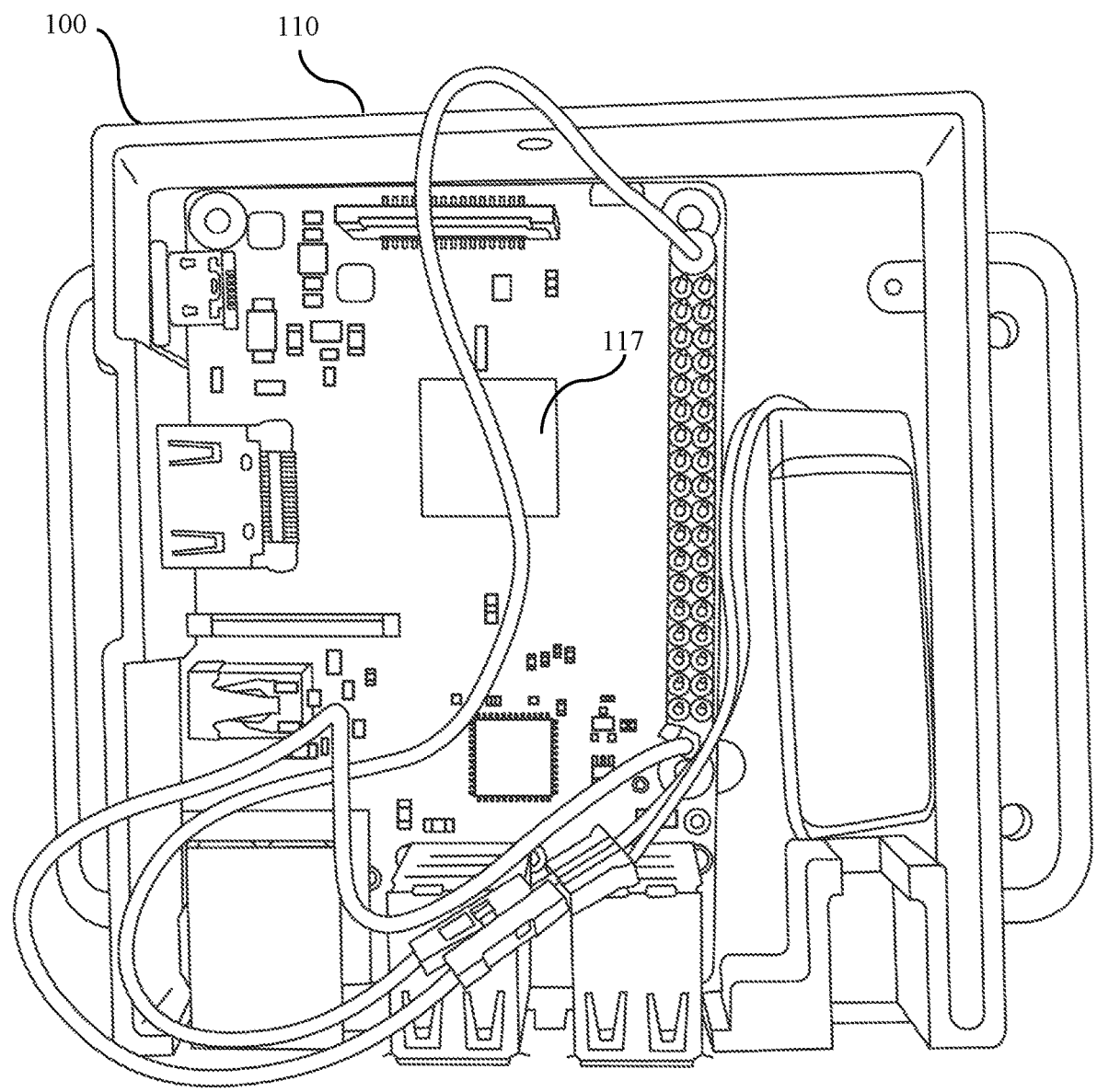
FIG. 6 is a rear perspective view of the internal parts of a main module of FIG. 1.
Figure 7:
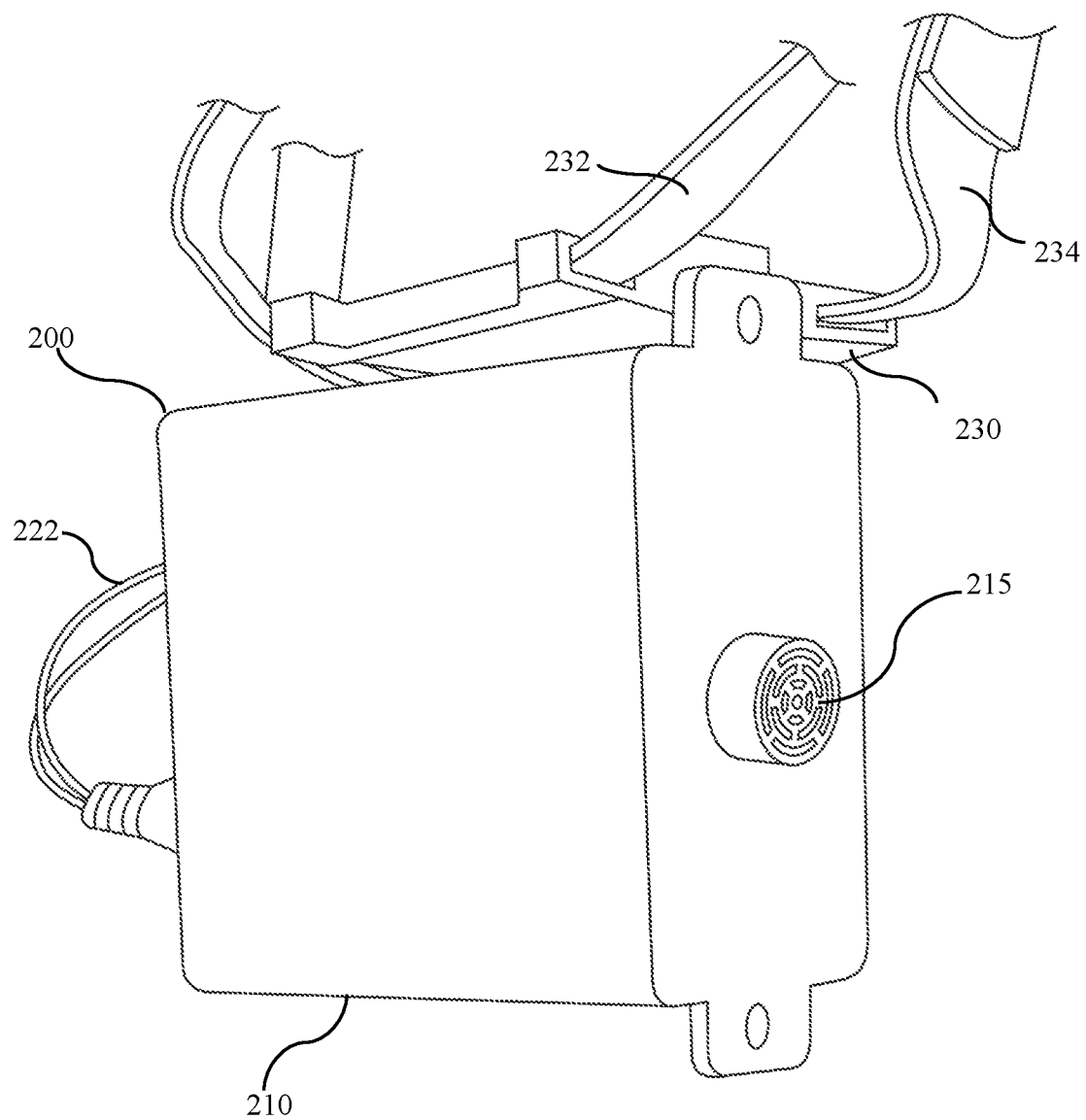
FIG. 7 is a front perspective view of a merge detector of the present invention.
Figure 8:
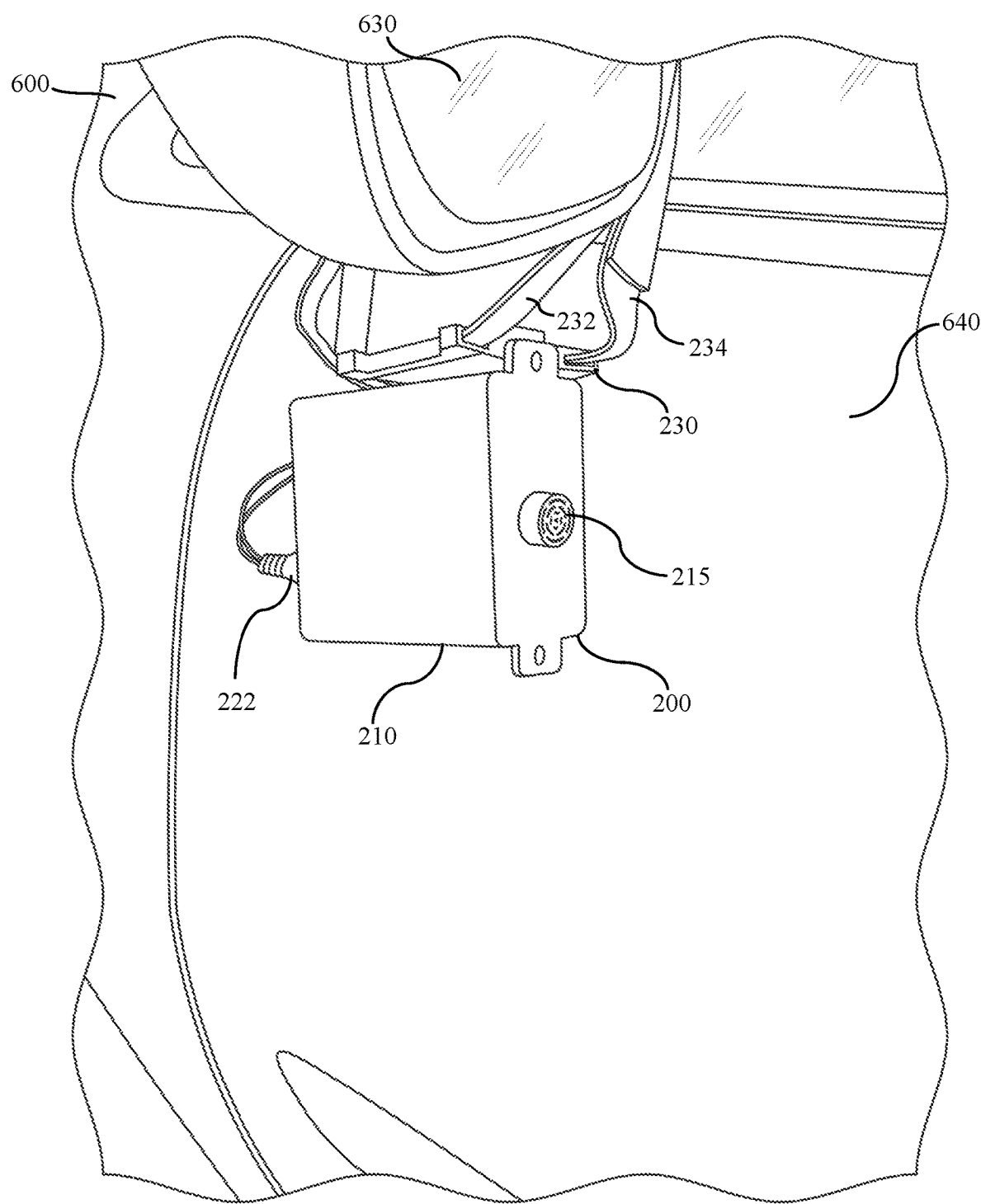
FIG. 8 is a front perspective view of a merge detector of FIG. 7 mounted on the driver's side mirror of an automobile.
Figure 9:
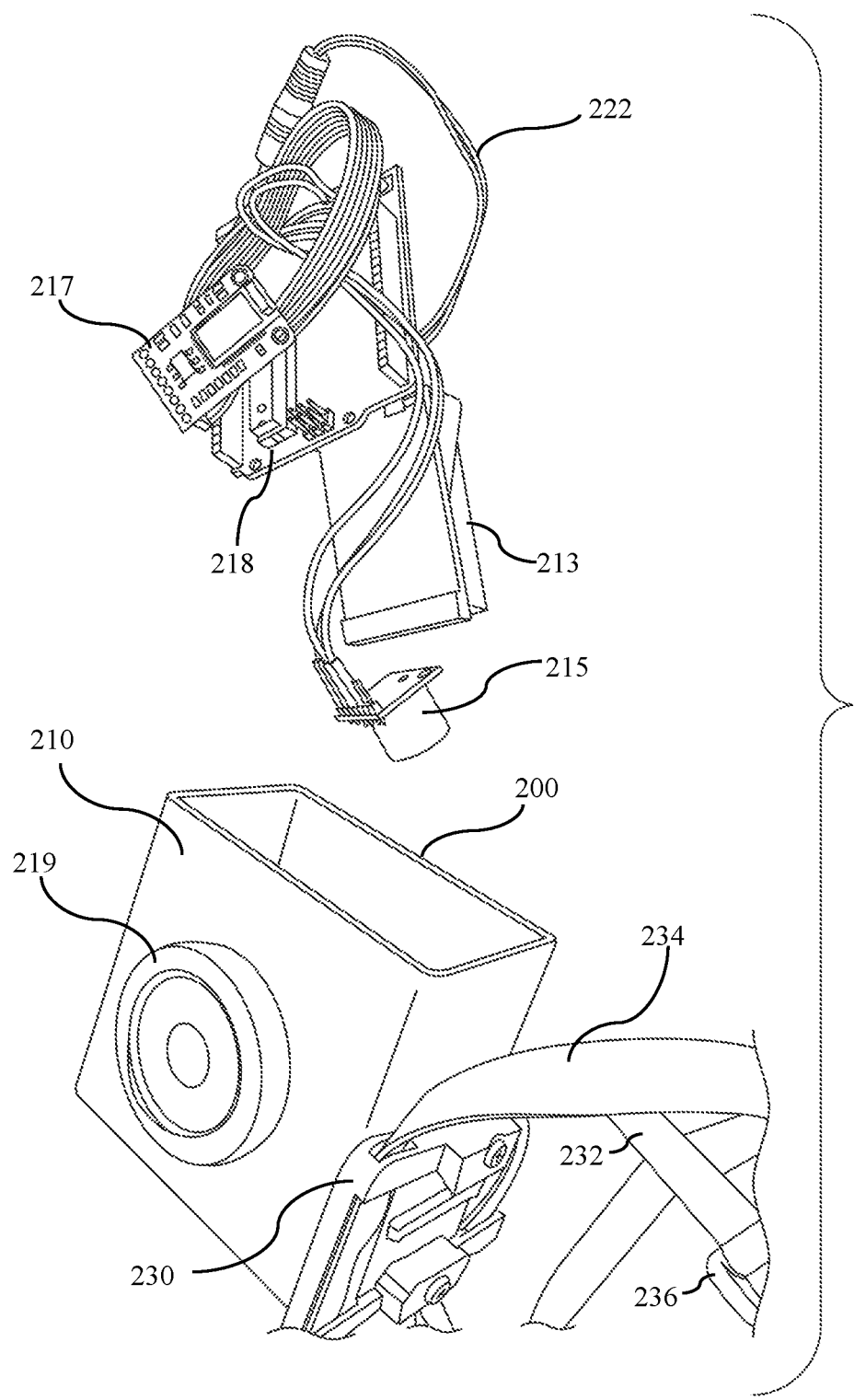
FIG. 9 is an exploded perspective view of a merge detector of FIG. 7 showing its internal parts.
Figure 10:
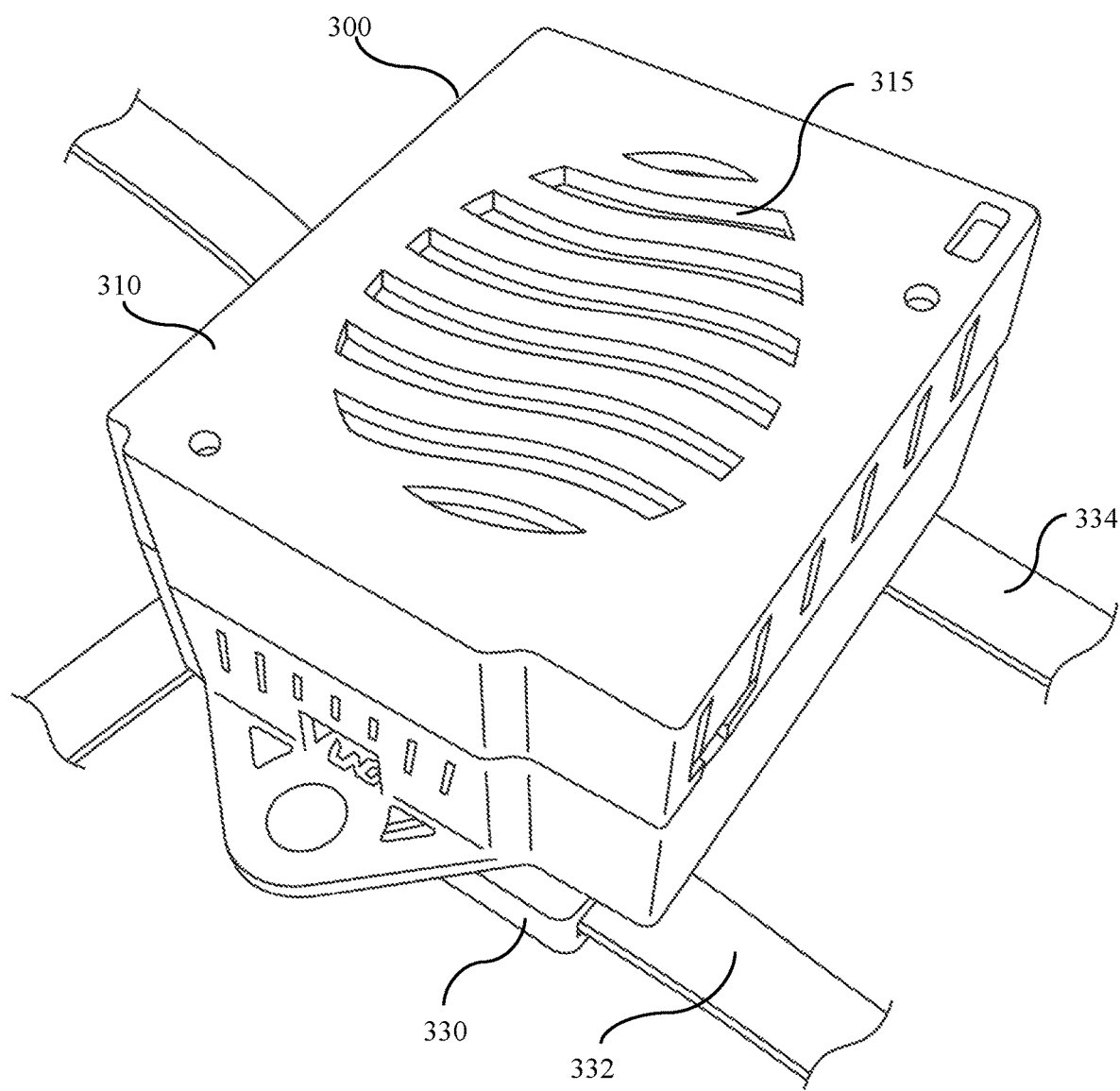
FIG. 10 is a front perspective view of a wheel detector of the present invention.
Figure 11:
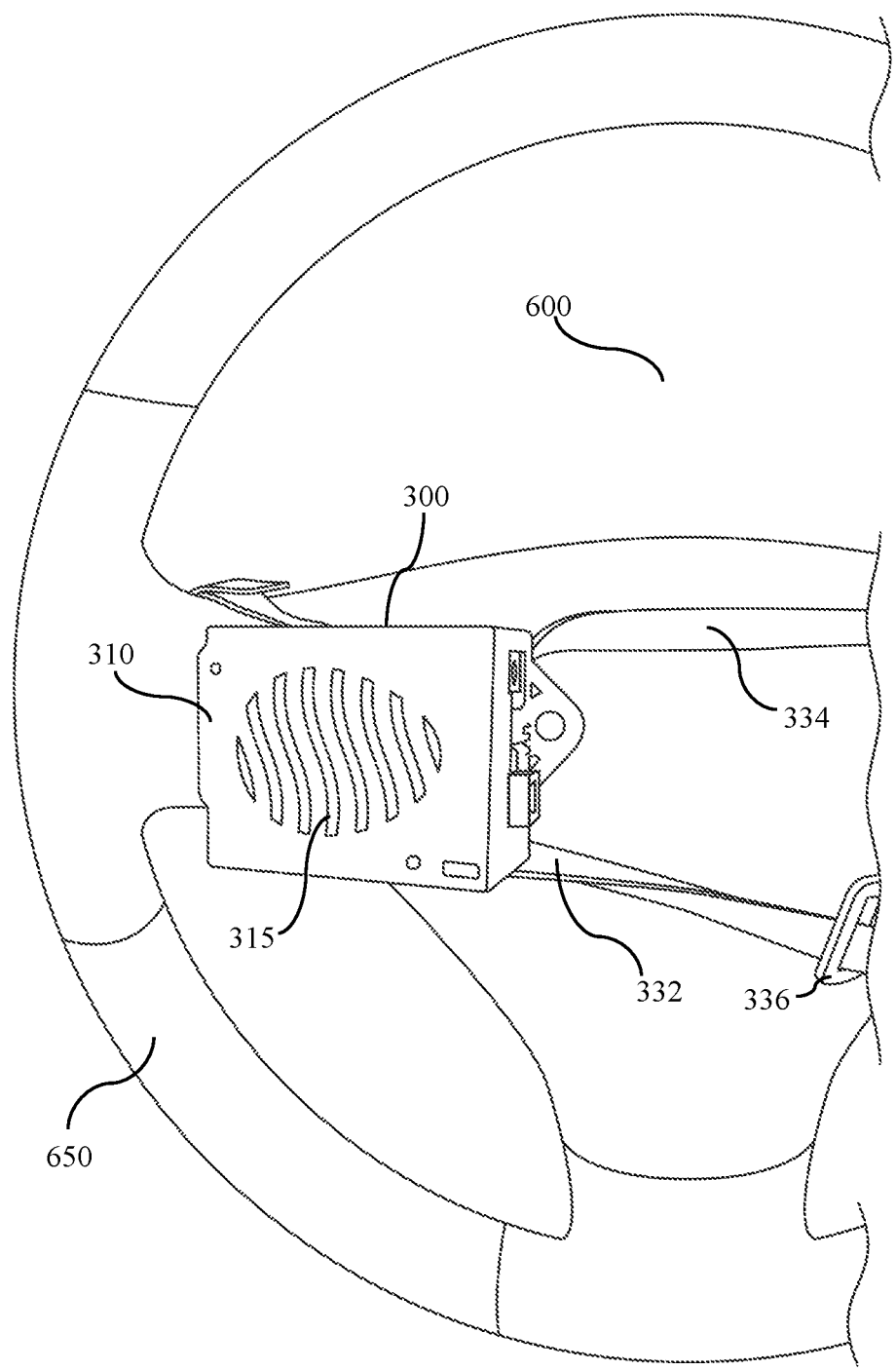
FIG. 11 is a front perspective view of a wheel detector of FIG. 10 mounted on the steering wheel of an automobile.
Figure 12:
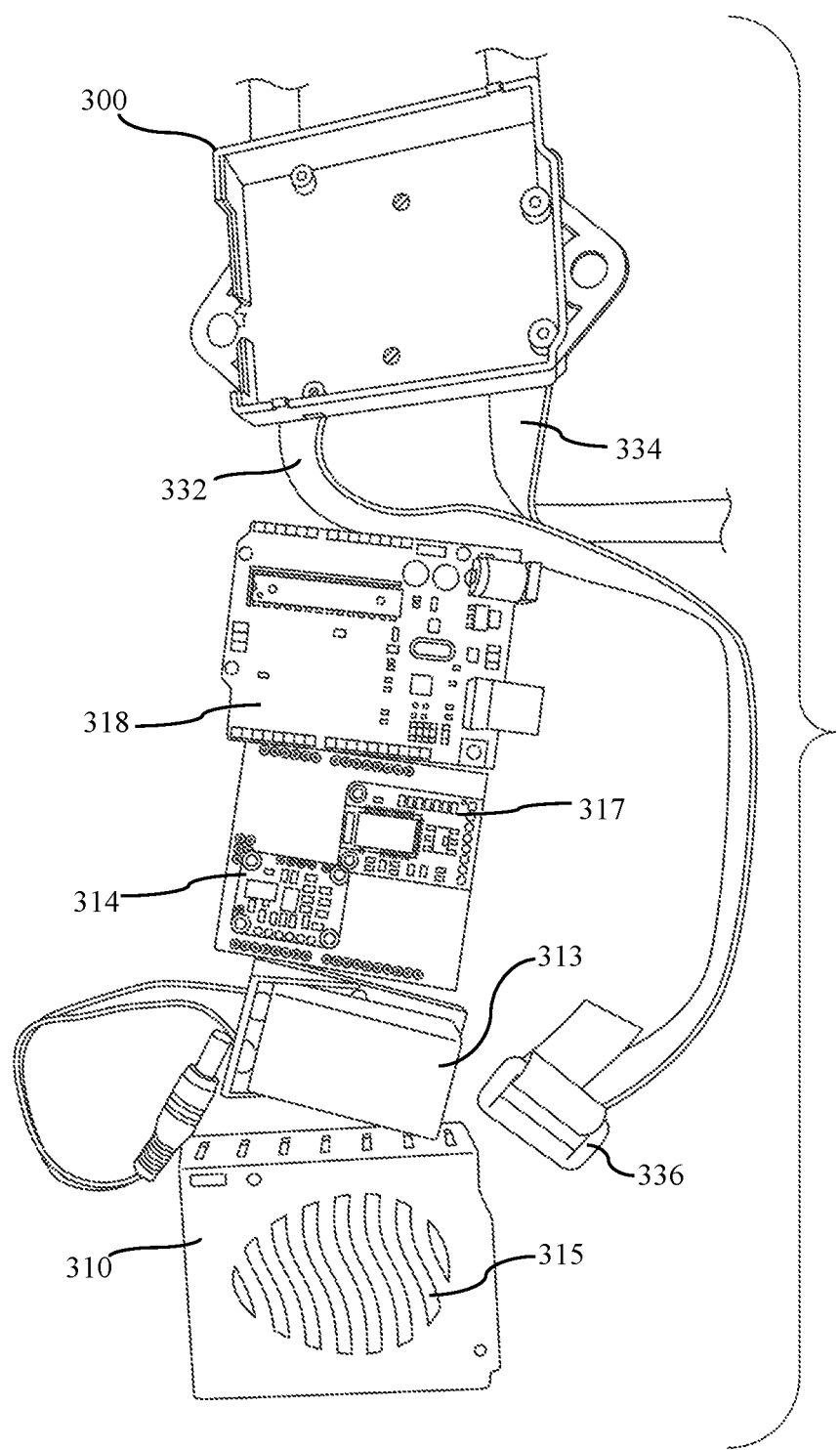
FIG. 12 is an exploded perspective view of a wheel detector of FIG. 10 showing its internal parts.
Figure 13:
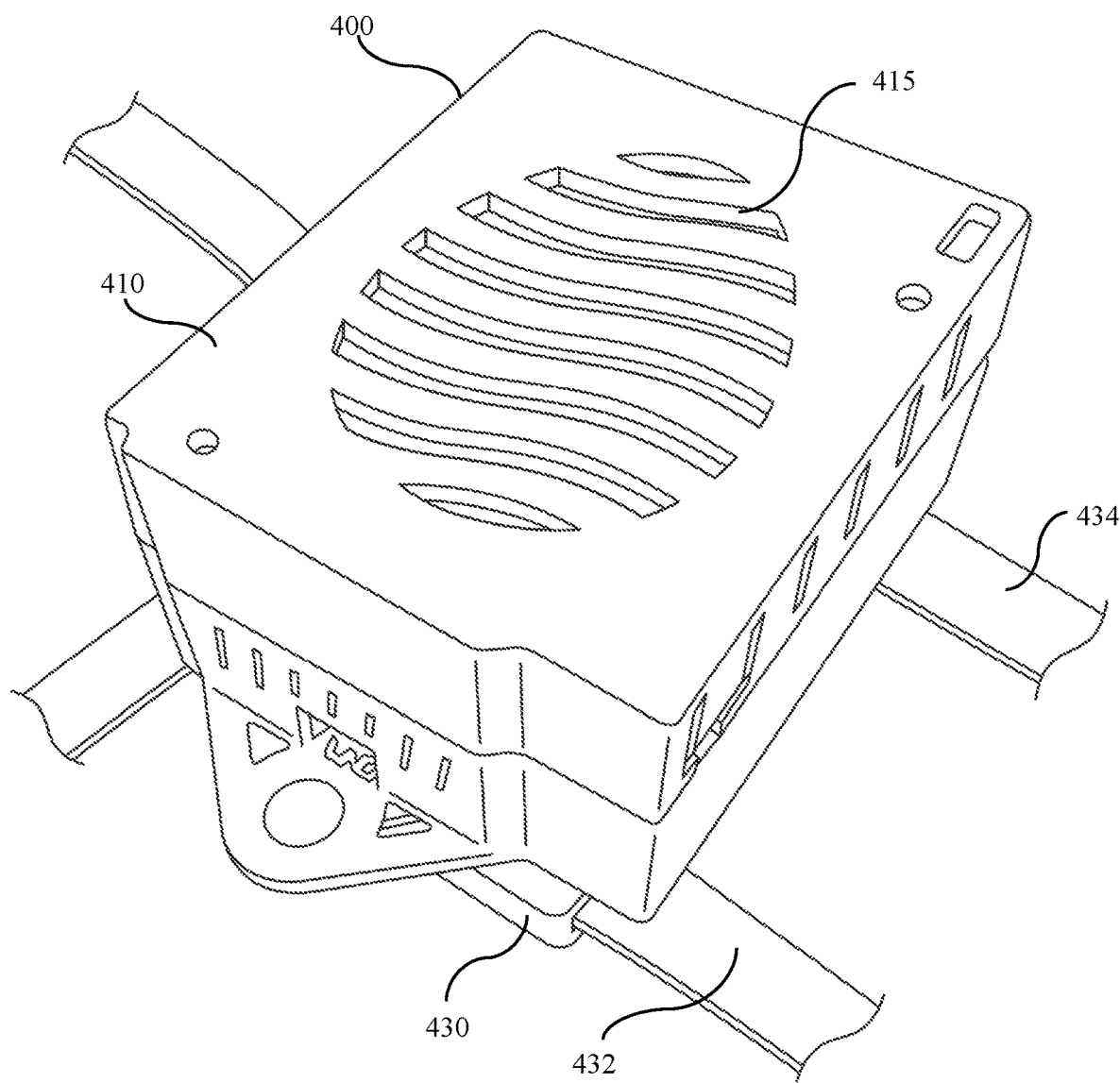
FIG. 13 is a front perspective view of a blink detector of the present invention.
Figure 14:
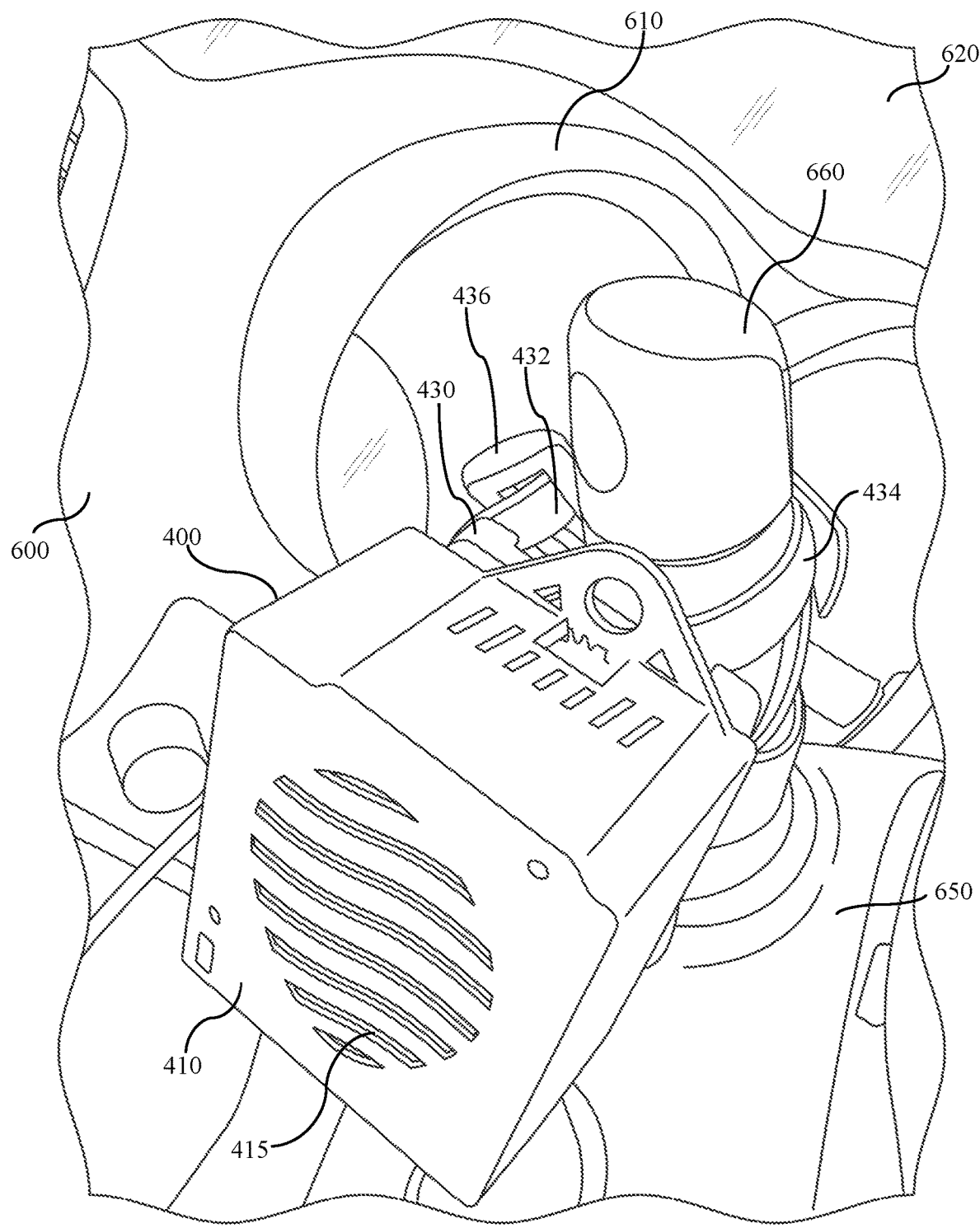
FIG. 14 is a front perspective view of a blink detector of FIG. 13 mounted on the turn signal switch of a steering wheel of an automobile.
Figure 15:
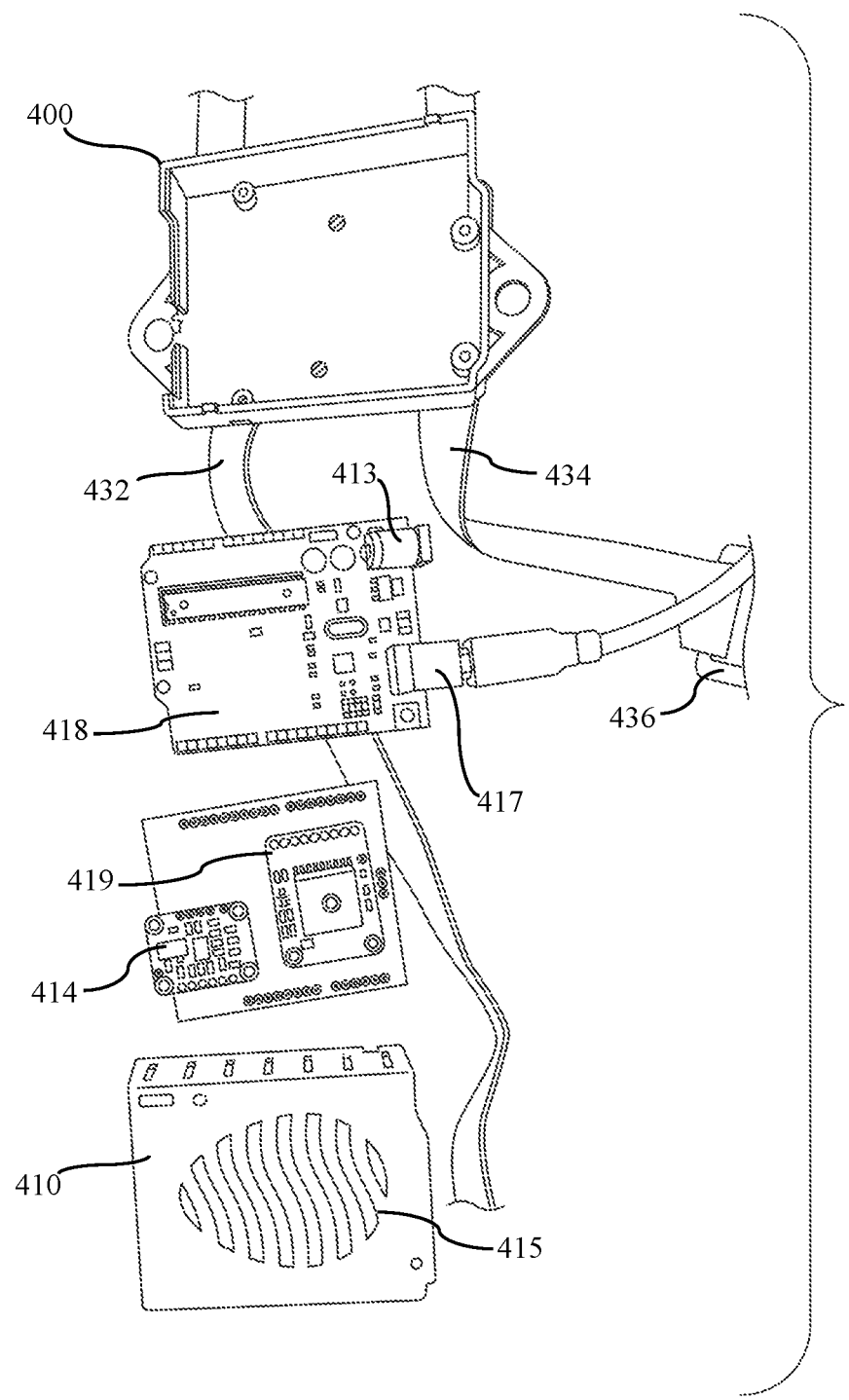
FIG. 15 is an exploded perspective view of a blink detector of FIG. 13 showing its internal parts.
Figure 16:
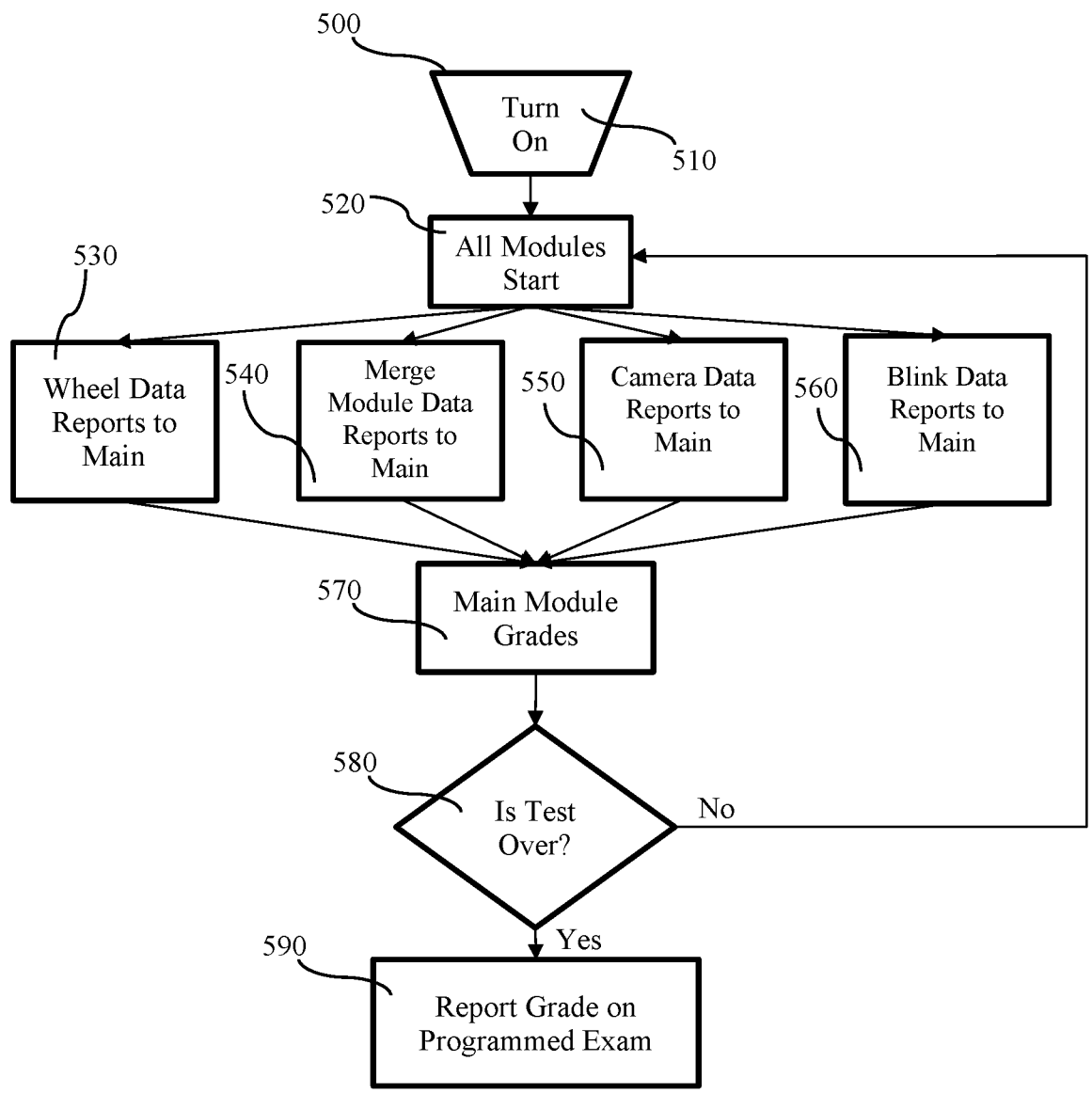
FIG. 16 is diagram of a flow chart describing the network interaction of the present invention.

Referring now to the most preferred embodiment of the invention, in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, and FIG. 16, an Automated Driver's Exam System, which comprises a main module 100, a merge detector 200, a wheel detector 300, and a blink detector 400, is shown. FIG. 1 is a front perspective view of a main module 100 of an Automated Driver's Exam System. FIG. 2 is a rear perspective view of a main module 100 of an Automated Driver's Exam System. FIG. 3 is a front perspective view of a main module 100 of an Automated Driver's Exam System mounted on the inside of a windshield 620 in the passenger compartment 610 of an automobile 600. FIG. 4 is a front perspective view of a main module 100 of an Automated Driver's Exam System mounted on the inside of a windshield 620 in the passenger compartment 610 of an automobile 600, which shows a dash camera 140 mounted on the inside of a windshield 620 in the passenger compartment 610 of an automobile 600 under the rear view mirror 625 of the automobile 600. FIG. 5 is a front perspective view of the internal parts of a main module 100 of an Automated Driver's Exam System. FIG. 6 is a rear perspective view of the internal parts of a main module 100 of an Automated Driver's Exam System. FIG. 7 is a front perspective view of a merge detector 200 of an Automated Driver's Exam System. FIG. 8 is a front perspective view of a merge detector 200 of an Automated Driver's Exam System mounted on the driver's side mirror 630 of an automobile 600. FIG. 9 is an exploded perspective view of a merge detector 200 of an Automated Driver's Exam System, which shows its internal parts. FIG. 10 is a front perspective view of a wheel detector 300 of an Automated Driver's Exam System. FIG. 11 is a front perspective view of a wheel detector 300 of an Automated Driver's Exam System mounted on the steering wheel 650 of an automobile 600. FIG. 12 is an exploded perspective view of a wheel detector 300 of an Automated Driver's Exam System, which shows its internal parts. FIG. 13 is a front perspective view of a blink detector 400 of an Automated Driver's Exam System. FIG. 14 is a front perspective view of a blink detector 400 of an Automated Driver's Exam System mounted on the turn signal switch 660 of a steering wheel 650 of an automobile 600. FIG. 15 is an exploded perspective view of a blink detector 400 of an Automated Driver's Exam System, which shows its internal parts. FIG. 16 is diagram of a flow chart 500 describing the network interaction of an Automated Driver's Exam System.

Referring still to the most preferred embodiment of the invention, in FIG. 1, FIG. 2, FIG. 3, FIG. 4, FIG. 5, and FIG. 6, a main module 100 of an Automated Driver's Exam System comprises a central hub 110, a first processor 117 and a second processor 118 that are connected to each other via TCP communication, a display screen 115, an audio speaker 112, a dash camera 140, a face camera 120, and a central hub attachment arm 130. The first processor 117 comprises a Raspberry Pi, or the like, and handles video processing for the dash camera 140 and face camera 120. The second processor 118 comprises a Raspberry Pi, or the like, and handles communications with sub-controllers and conveys data to users on the display screen 115 and to signal audio cues at significant events using the audio speaker 112. The dash camera 140 comprises a dash video camera 145, a dash camera attachment arm 147 from which the dash video camera 145 depends, and a dash camera cable 132, which connects the dash video camera 145 to the first processor 117 of the main module 100. The dash camera 140 is typically mounted at midpoint of the front window 620 of the automobile 600 using the dash camera attachment arm 147 and gathers live video, which is processed by the first processor 117 using deep learning techniques so that traffic data, signage, other vehicles, pedestrians, or the like, can be detected, identified, and classified, in conjunction with available state information regarding road features or traffic conditions. The face camera 120 comprises a face video camera 125, a face camera attachment arm 122 that attaches the face video camera 125 to the central hub 110, and a face camera cable 134 that connects the face video camera 125 to the first processor 117 of the main module 100, and gathers live video of a driver, which is processed by the first processor 117 using deep learning techniques in order to detect and identify the driver's facial position and to determine whether the driver is using the proper eye and head movement and posture while maneuvering the vehicle. The central hub 110 mounts to the front window 620 of the automobile 600 using the central hub attachment arm 130.

Referring still to the most preferred embodiment of the invention, in FIG. 7, FIG. 8, and FIG. 9, a merge detector 200 of an Automated Driver's Exam System detects and reports distances of objects, which are close to the side of the automobile 600, in order determine whether or not it is safe to merge or if there is an object that will or should prevent a merge. The merge detector 200 comprises a body housing 210, a microcontroller 218, an ultrasonic rangefinder 215, a first BLE communication device 217, magnetic connectors 219, Velcro straps 232, 234, a strap mount 230, and a first battery 213. The body housing 210 contains the microcontroller 218, ultrasonic rangefinder 215, first BLE communication device 217, and first battery 213, and connects to the driver's side door 640 of the automobile 600 using the magnetic connectors 219 and the Velcro straps 232, 234, which may be secured to the side-view mirrors 630 of the automobile 600. The ultrasonic rangefinder 215 identifies objects, which are within a wide cone of the merge detector's 200 position under the side-view mirror 630.

Referring still to the most preferred embodiment of the invention, in FIG. 10, FIG. 11, and FIG. 12, a wheel detector 300 of an Automated Driver's Exam System determines the handling of the automobile 600 during an automated driver's exam and comprises a first small housing 310, a first IMU sensor 314, a first microcontroller system 318, a second BLE communication device 317, second Velcro straps 332, 334, and a second battery 313. The first small housing 310 contains the first IMU sensor 314, the first microcontroller system 318, the second BLE communication device 317, and the second battery 313, and fastens to the steering wheel 650 of the automobile 600 using the second Velcro straps 332, 334. The first IMU sensor 314 comprises a fusion between a magnetometer and an accelerometer, and is used to report positions to the first microcontroller system 318. When small changes in position are made on one axis, the first IMU sensor 314 reports the changes in position to the main module 100 using the second BLE communication device 317.

Referring still to the most preferred embodiment of the invention, in FIG. 13, FIG. 14, and FIG. 15, a blink detector 400 of an Automated Driver's Exam System determines whether proper turn signals are used during an automated driver's exam and comprises The second small housing 410 contains the second IMU sensor 414, the second microcontroller system 418, the GPS module 419, and the third battery 413, and fastens to the turn signal switch 660 of the steering wheel 650 of the automobile 600 using the Velcro straps 432, 434. The second IMU sensor 414 comprises a fusion between a magnetometer and an accelerometer, and is used to report positions to the second microcontroller system 418. When small changes in position are made on one axis, the second IMU sensor 414 reports the changes in position to the main module 100 using the serial USB communication device 417. The GPS module 419 tracks position and speed relative to previous positions and reports this data to the main module 100 using the serial USB communication device 417.

Referring still to the most preferred embodiment of the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, and FIG. 16, in FIG. 16, a diagram of a flow chart 500 describing the network interaction of an Automated Driver's Exam System is shown. First, in the initial step 510, the system is turned on in order to begin an automated driver's exam and the driver begins to drive the automobile through a set driving course. Next, in the start modules step 520, all of the modules start up, including the main module 100, the merge detector 200, the wheel detector 300, and the blink detector 400. Next, each of the modules begin to gather data and report this information to the main module 100. In the wheel step 530, data gathered from the first IMU sensor 314 of the wheel detector 300 is reported from the first microcontroller system 318 to the main module 100 using the second BLE communication device 317. In the merge step 540, data gathered from the ultrasonic rangefinder 215 of the merge detector 200 is reported from the microcontroller 218 to the main module 100 using the first BLE communication device 217. In the camera step 550, data gathered from the dash camera 140 and face camera 120 is reported to the main module 100. In the blink step 560, data gathered from the a second IMU sensor 414 and GPS module 419 of the blink detector 400 is reported from the second microcontroller system 418 to the main module 100 using the serial USB communication device 417. Next, in the grade step 570, the main module 100 compares the data gathered during the wheel step 530, the merge step 540, the camera step 550, and the blink step 560, to benchmark data, which represents data gathered from a properly driven set driving course, to determine whether the automatic driver's exam is passed. Next, in the end test decision step 580, whether the test is over is determined. If the test is not over, then the start modules step 520 is repeated. If the test is over, the grade is reported for the automatic driver's exam in the report grade step 590.

In further detail, still referring to the most preferred embodiment of the invention of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, and FIG. 16, before an automated driving test, the system is mounted on a standard automobile 600 by mounting the central hub 110 of the main module 100 to the windshield 620 of the automobile 600 near the driver, mounting the dash camera 140 to the windshield 620 of the automobile 600 under the rear view mirror 625, connecting the dash camera 140 to the central hub 110 of the main module 100, mounting the merge detector 200 to the driver's side door 640 of the automobile 600 using the magnetic connectors 219 and the Velcro straps 232, 234, of the merge detector 200, mounting the wheel detector 300 to the steering wheel 650 of the automobile 600 using the second Velcro straps 332, 334, of the wheel detector 300, and mounting the blink detector 400 to the turn signal switch 660 of a steering wheel 650 of the automobile 600 using the third Velcro straps 432, 434, of the blink detector 400. Next, a set driving course along ordinary roads is properly driven with the Automated Driver's Exam System activated, and the main module 100, merge detector 200, wheel detector 300, and blink detector, measure benchmark data of a properly driven set driving course and send the measured benchmark data to the second processor 118 where it is stored in the memory. During an automated driver's exam, a prospective licensed driver drives the automobile 600 along the set driving course along ordinary roads with the mounted Automated Driver's Exam System activated. Data gathered from the main module 100, the merge detector 200, the wheel detector 300, and the blink detector 400, during the automatic driver's exam is then compared to the benchmark data in order to determine whether the driver's exam is passed, at which point the status of the exam is displayed on the display screen 115 of the main module 100.

The construction details of the invention as shown FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, and FIG. 16, are as follows. The central hub 110 of the main module 100 comprises a strong, rigid, durable material, such as aluminum, metal, steel, glass, plastic, polycarbonate, composite material, ceramic, fiberglass, wood, or the like. The first processor 117 of the main module 100 comprises a compact computer, a hard drive, a Raspberry Pi, or the like. The second processor 118 of the main module 100 comprises a compact computer, a hard drive, a Raspberry Pi, or the like. The first processor 117 and the second processor 118 are connected to each other via TCP communication. The display screen 115 of the main module 100 comprises a monitor, an LCD screen, an LED screen, a television, or the like. The audio speaker 112 of the main module 100 comprises a speaker, or the like. The dash camera 140 of the main module 100 comprises a video camera, a web camera, a digital camera, or the like. The face camera 120 of the main module 100 comprises a video camera, a web camera, a digital camera, or the like. The central hub attachment arm 130 of the main module 100 comprises a suction cup and a strong flexible material, which may be articulated, such as aluminum, metal, steel, glass, plastic, polycarbonate, composite material, ceramic, fiberglass, wood, or the like. The body housing 210 of the merge detector 200 comprises a strong, rigid, lightweight material, such as aluminum, metal, steel, glass, plastic, polycarbonate, composite material, ceramic, fiberglass, wood, or the like. The microcontroller 218 of the merge detector 200 comprises a compact computer, a hard drive, a Raspberry Pi, or the like. The ultrasonic rangefinder 215 of the merge detector 200 comprises an electronic ultrasonic rangefinder, or the like. The first BLE communication device 217 of the merge detector 200 comprises a wireless communication device, a Bluetooth communication device, a near field communication device, or the like. The magnetic connectors 219 of the merge detector 200 comprise magnets, or the like. The Velcro straps 232, 234, of the merge detector 200 comprise Velcro cloth, plastic, buckles 236, or the like. The strap mount 230 of the merge detector 200 comprises a strong, rigid, durable material, such as aluminum, metal, steel, glass, plastic, polycarbonate, composite material, ceramic, fiberglass, wood, or the like. The first battery 213 of the merge detector 200 comprises a battery, a rechargeable battery, a lithium battery, or the like. The first small housing 310 of the wheel detector 300 comprises a strong, rigid, durable material, such as aluminum, metal, steel, glass, plastic, polycarbonate, composite material, ceramic, fiberglass, wood, or the like. The first IMU sensor 314 of the wheel detector 300 comprises an electronic device that is a fusion between a magnetometer and an accelerometer, or the like. The first microcontroller system 318 of the wheel detector 300 comprises a compact computer, a hard drive, a Raspberry Pi, or the like. The second BLE communication device 317 of the wheel detector 300 comprises a wireless communication device, a Bluetooth communication device, a near field communication device, or the like. The second Velcro straps 332, 334, of the wheel detector 300 comprise Velcro cloth, plastic, buckles 336, or the like. The second battery 313 of the wheel detector 300 comprises a battery, a rechargeable battery, a lithium battery, or the like. The second small housing 410 of the blink detector 400 comprises a strong, rigid, lightweight material, such as aluminum, metal, steel, glass, plastic, polycarbonate, composite material, ceramic, fiberglass, wood, or the like. The second IMU sensor 414 of the blink detector 400 comprises an electronic device that is a fusion between a magnetometer and an accelerometer, or the like. The second microcontroller system 418 of the blink detector 400 comprises a compact computer, a hard drive, a Raspberry Pi, or the like. The serial USB communication device 417 of the blink detector 400 comprises a wired communication device, or the like. The GPS module 419 of the blink detector 400 comprises an electronic device with GPS capabilities, or the like. The third Velcro straps 432, 434, of the blink detector 400 comprise Velcro cloth, plastic, buckles 436, or the like. The third battery 413 of the blink detector 400 comprises a battery, a rechargeable battery, a lithium battery, or the like. The materials listed herein are examples only and not intended to limit the scope of the present invention.

The advantages of the present invention include, without limitation, that it provides a convenient means of modifying an ordinary automobile to perform a driver's exam, that it allows driver's license exams to be automatically performed without the use of expensive specialized vehicles, that it allows driver's license exams to be automatically performed without needing trained employees or personnel to accompany the prospective licensed driver and perform the examination, who may have bias against the prospective licensed driver or lack consistency in rendering driver's exams, and that it allows for a prospective driver to practice taking a driver's exam using their own vehicle and on ordinary roads thereby providing real-time examination experience in order for the prospective driver to improve their skills.

In broad embodiment, the present invention relates generally to a system for modifying a standard automobile in order to perform an automated driver's exam on a driver of the modified automobile.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods that are within the scope and spirit of the invention as claimed.

What is claimed is:

1. A system for performing an automatic driver's exam on a driver using an automobile;
   said automobile comprising:
      a windshield,
      a driver's side door,
      a side-view mirror depending from said driver's side door,
      a steering wheel, and
      a turn signal switch depending from said steering wheel;

said system comprising:
- a merge detector, said merge detector comprising:
  - a body housing,
  - a microcontroller,
  - an ultrasonic rangefinder,
  - a first BLE communication device,
  - magnetic connectors,
  - first Velcro straps,
  - a first battery, and
  - a body housing, which contains said microcontroller, said ultrasonic rangefinder, said first BLE communication device, and said first battery, and which connects to said driver's side door of said automobile using said magnetic connectors and said first Velcro straps, which may be secured to said side-view mirror of said automobile;
- a wheel detector, said wheel detector comprising:
  - a first microcontroller system,
  - a second BLE communication device,
  - second Velcro straps,
  - a second battery,
  - a first IMU sensor, which comprises a magnetometer and an accelerometer and which is used to report changes in positions to said first microcontroller system, and
  - a first small housing, which contains said first microcontroller system, said second BLE communication device, said second battery, and said IMU sensor, and which fastens to said steering wheel of said automobile using said second Velcro straps;
- a blink detector, said blink detector comprising:
  - a second microcontroller system,
  - a serial USB communication device,
  - a GPS module, which reports position and speed to said second microcontroller system,
  - third Velcro straps,
  - a third battery,
  - a second IMU sensor, which is used to report changes in positions to said second microcontroller system, and
  - a second small housing, which contains said second microcontroller system, said GPS module, said third battery, and said second IMU sensor, and which fastens to the said turn signal switch of said steering wheel of said automobile using said third Velcro straps; and
- a main module, said main module comprising:
  - a central hub,
  - a display screen depending from said central hub,
  - an audio speaker depending from said central hub,
  - a dash camera, said dash camera comprising:
    - a first video camera, which is mounted on said windshield of said automobile,
  - a face camera, said face camera comprising:
    - a second video camera attached to said central hub,
  - a first processor, said first processor being capable of interacting with said dash camera and said face camera in order to process video signals from said dash camera and said face camera, and
  - a second processor, said second processor comprising:
    - a memory stored in non-transitory computer-readable medium,
    - said second processor being capable of interacting with said first processor via TCP communication, with said microcontroller of said merge detector using said first BLE communication device, with said first microcontroller system of said wheel detector using said second BLE communication device, with said second microcontroller system of said blink detector using said serial USB communication device, with said display screen, and with said audio speaker, in order to gather data and store said data in said memory, convey said data on said display screen, and to signal audio cues using said audio speaker, said data comprising information generated by said main module, said merge detector, said wheel detector, and said blink detector;
- wherein said dash camera of said main module gathers live video of the surroundings of said automobile, which is processed by said first processor using deep learning techniques so that traffic data, signage, other vehicles, pedestrians, or obstacles may be detected, identified, and classified, in conjunction with available state information regarding road features and traffic conditions,
- wherein said face camera of said main module gathers live video of said driver, which is processed by said first processor using said deep learning techniques in order to detect and identify said driver's facial position and to determine whether said driver is using the proper eye and head movement while maneuvering said automobile;
- wherein said merge detector detects and reports distances of objects that are close to said driver's side door of said automobile using said ultrasonic rangefinder;
- wherein said wheel detector detects and reports the handling of said steering wheel of said automobile using said first IMU sensor;
- wherein said blink detector detects and reports position using said GPS module and the use of turn signals using said second IMU sensor;
- wherein a set driving course is properly driven while recording said data from said main module, said merge detector, said wheel detector, and said blink detector, to determine benchmark data, said benchmark data comprising said data recorded during properly driven said set driving course;
- wherein said set driving course is driven by said driver during said automatic driver's exam while recording said data from said main module, said merge detector, said wheel detector, and said blink detector, to determine exam data, said exam data comprising said data recorded during said set driving course driven by said driver; and
- wherein said exam data is compared to said benchmark data by said second processor in order to determine whether said driver passed said automatic driver's exam.

* * * * *